United States Patent
Rumpel et al.

(10) Patent No.: US 6,884,102 B2
(45) Date of Patent: Apr. 26, 2005

(54) SMART CARD CONNECTOR

(75) Inventors: Jochen Rumpel, Nordheim (DE); Gerhard Braun, Bretzfeld (DE)

(73) Assignee: Amphenol-Tuchel Electronics GmbH (DE)

( * ) Notice: Subject to any disclaimer, the term of this patent is extended or adjusted under 35 U.S.C. 154(b) by 539 days.

(21) Appl. No.: 10/130,177

(22) PCT Filed: May 31, 2001

(86) PCT No.: PCT/EP01/06202

§ 371 (c)(1),
(2), (4) Date: May 10, 2002

(87) PCT Pub. No.: WO01/93181

PCT Pub. Date: Dec. 6, 2001

(65) Prior Publication Data

US 2002/0170963 A1 Nov. 21, 2002

(30) Foreign Application Priority Data

May 31, 2000 (DE) .......................... 100 27 131

(51) Int. Cl.[7] ............................................. H01R 13/62
(52) U.S. Cl. .................... 439/331; 439/157; 439/630
(58) Field of Search ................................ 439/331, 157, 439/630–632

(56) References Cited

U.S. PATENT DOCUMENTS

| | | | |
|---|---|---|---|
| 5,320,552 A | | 6/1994 | Reichardt et al. ........... 439/331 |
| 5,814,805 A | | 9/1998 | Reichardt et al. ........... 235/479 |
| 5,996,891 A | | 12/1999 | Braun ........................ 439/331 |
| 6,024,593 A | * | 2/2000 | Hyland ....................... 439/326 |
| 6,106,317 A | * | 8/2000 | Michaelis et al. ........... 439/326 |
| 6,174,188 B1 | * | 1/2001 | Martucci ..................... 439/326 |
| 6,176,721 B1 | * | 1/2001 | Gottardo et al. ............ 439/260 |
| 6,319,036 B1 | * | 11/2001 | Zheng et al. ................ 439/326 |
| 6,334,786 B1 | * | 1/2002 | Lee ............................. 439/331 |
| 6,471,550 B1 | * | 10/2002 | Maiterth et al. ............ 439/631 |
| 6,743,035 B1 | * | 6/2004 | Yang .......................... 439/326 |

* cited by examiner

Primary Examiner—Truc Nguyen
(74) Attorney, Agent, or Firm—Blank Rome LLP

(57) ABSTRACT

Smart-card connector (1) having a contact element support (11) within which contact elements are supported. A cover (12) is pivotably mounted at the contact element support (11). A cam (50) is provided at said cover (12) so as to bearing means (48) of the cover out of the pivot location at the contact element support in case the cover is improperly operated.

14 Claims, 2 Drawing Sheets

SMART CARD CONNECTOR

TECHNICAL FIELD

The present invention relates generally to a connector or contacting apparatus for a smart card or a chip card. Preferably the invention relates to a SIM-card connector having a contact element support preferably in the form of a frame and a cover pivotally mounted at said contact element support.

BACKGROUND ART

Smart-card connectors for smart cards, in particular for SIM-cards are well-known and frequently comprise a contact element support and a cover pivotally mounted at said contact element support. The cover is adapted to support a smart card or a SIM card in its inserted position. EP 0 472 692 discloses such a smart card connector. Typically, the contact element support, in particular a frame forming the contact element support, as well as the cover are two separate components which are made of plastic material by means of injection moulding. In general, the cover comprises bearing means in the form of pivot pins which are inserted into suitable bearing means at the contact element support. The position of the pivot pins defines the rotary or pivot axis about which the cover is pivoted when opening or closing the cover. Frequently, the cover and/or the contact element support comprise suitable latching means, so as to latch or lock the cover in a locked position and to hold the cover safely at or within the contact element support. In this manner, a secure mounting of the inserted card is guaranteed, even if impact forces occur.

DISCLOSURE OF THE INVENTION

If a connector for a smart card or for a SIM-card is used in a mobile telephone, frequently only a limited amount of space is available for placing the connector in the apparatus, for instance a mobile telephone. For this reason smart card or SIM-card connectors are small and are desirably not much larger than the SIM-card itself.

In particular, when pivoting the cover from the closed to an open position, it may happen that the cover is pivoted beyond a certain angular degree with the result that the pivot pins of the cover and/or the bearing means in the contact element support are possibly damaged or destroyed.

It is desirable that the cover will disengage and move into a relief position so as to avoid any damages at the contact element support bearing means and/or cover bearing means.

The present invention provides a smart-card connector, in particular a SIM-card connector, which will not be damaged if its cover is opened beyond a certain degree. The invention provides for a certain disengagement of the cover from the contact element support or for a relief position so that, even if a faulty operation of the cover occurs, a destruction or deterioration of the cover and/or contact element support, in particular the bearing means thereof, is avoided.

In accordance with the present invention a smart card connector, in particular a SIM-card connector, is provided. The SIM-card connector comprises a contact element support, preferably in the form of a frame. A cover is pivotally mounted about a pivot axis due to the engagement of contact element support bearing means and cover bearing means. The cover is pivotally and slidably mounted at the contact element support. The cover can be moved from an opening position, in which the cover is approximately sixty degrees open with respect to the plane defined by the contact element support, into a closed position where the cover is in abutment with the upper surface of the contact element support. From this closed position the cover can be slidably moved in a horizontal plane in a locking or latching position. In case the cover is moved from the opening position into an even more open position, i.e. beyond a certain angular degree, then cam means are provided at the cover to move the cover into a relief position avoiding any damage of the bearing means of the contact element support and of the cover.

The cam means preferably co-operates with a cam or leveraging surface with which the cam means comes into engagement when the cover is pivoted beyond a certain angular degree. When the cam means comes into engagement with the leveraging surface, the bearing means of the cover and the cover are moved out of the pivoting position into a relief position.

The leveraging surface can be provided by the apparatus within which the smart-card connector is inserted. Alternatively, the leveraging surface can be provided at the contacting element support. In a particularly desirable embodiment, the leveraging surface is a mounting surface in the apparatus onto which a mounting side or surface of the contact element support is placed when the smart-card connector is installed in the apparatus, e.g. a mobile telephone. This provides for a great flexibility when installing the smart-card connector in an apparatus.

BRIEF DESCRIPTION OF THE DRAWINGS

For a better understanding of the present invention, reference may be made to the accompanying drawings, in which:

FIGS. 1 to 4 disclose a smart-card connector more specifically a SIM-card connector 1 in accordance with a preferred embodiment of the present invention in side-elevational views. i.e. the SIM-card connector 1 extends into the plane of the drawing and would have in substance the same side elevational view from the opposite side as it is shown in FIG. 1. The smart-card connector 1 can be installed into an apparatus 7, preferably a cell phone. The apparatus 7 is only schematically represented showing those parts of the apparatus 7 which are adjacent to the smart-card connector 1. The smart-card connector 1 comprises a housing or contact element support 11 preferably in the form of a frame 11. At one end of the contact-element support 11 a cover 12 is pivotally mounted about a pivot or rotary axis 13. Contact element support 11 and cover 12 are preferably made as injection moulded components of plastic material. The cover 12 comprises a SIM-card cover portion 42 with an actuating portion 46 at the free end of the cover 12 and a cover hinge or bearing portion 44 at the opposite end. Preferably, there are two laterally oppositely located actuating portions 46 and two laterally oppositely located hinge portions 44.

Preferably, contact elements, which are not shown, are supported within the contact element support 11. The contact elements are adapted to contact contact surfaces of a smart card, in particularly of a SIM-card which is inserted into the smart-card connector 1. In FIGS. 1 to 5 the SIM-card is not shown. However, it is clear, that such a SIM-card can be inserted either directly into the contact element support 11 or—as is preferred—into the cover 12 such that the contact surfaces of the card will contact the contact elements mounted in the contact element support 11 in case the cover 12 is in a closed position (not shown).

The contact-element support 11 comprises a bottom surface 14. The contact element support 11 is mounted on a mounting surface 17 of the apparatus 7 by means of the bottom surface 14, as it is shown in FIGS. 1 to 5. The mounting surface 17 can be a part of the printed circuit board (not shown), which serves for contacting of the contact elements supported within the contact element support 11. In FIGS. 1 to 5 the bottom surface 14 is shown as being spaced with a certain distance with respect to the mounting surface 17 of the apparatus 6. Preferably, however, the bottom surface 14 of the smart-card connector 1 is in immediate contact with the mounting surface 17.

The contact element support 11 is provided with contact element support bearing means adapted to co-operate with cover bearing means such that the cover 12 can be pivoted from the opening position of FIG. 1 into a closed position (not shown) in which the cover 12 extends horizontally. From the closed position the cover 12 can be slidably moved leftwardly into a locked position where the actuating portion (s) 46 of the cover 12 lockingly engages a part of the contact element support 11. FIG. 5 discloses, as far as the contact element support bearing means is concerned, one of two bearing blocks or bearings 19 which define a bearing recess or bearing location 20. The other bearing block 19 is not shown in the drawings but is located at the opposite side of the contact element support 11 spaced by a distance of about the width of the SIM-card. The bearing recess 20 bearingly supports the pivotable cover 12, as will be described below.

Figure 1:
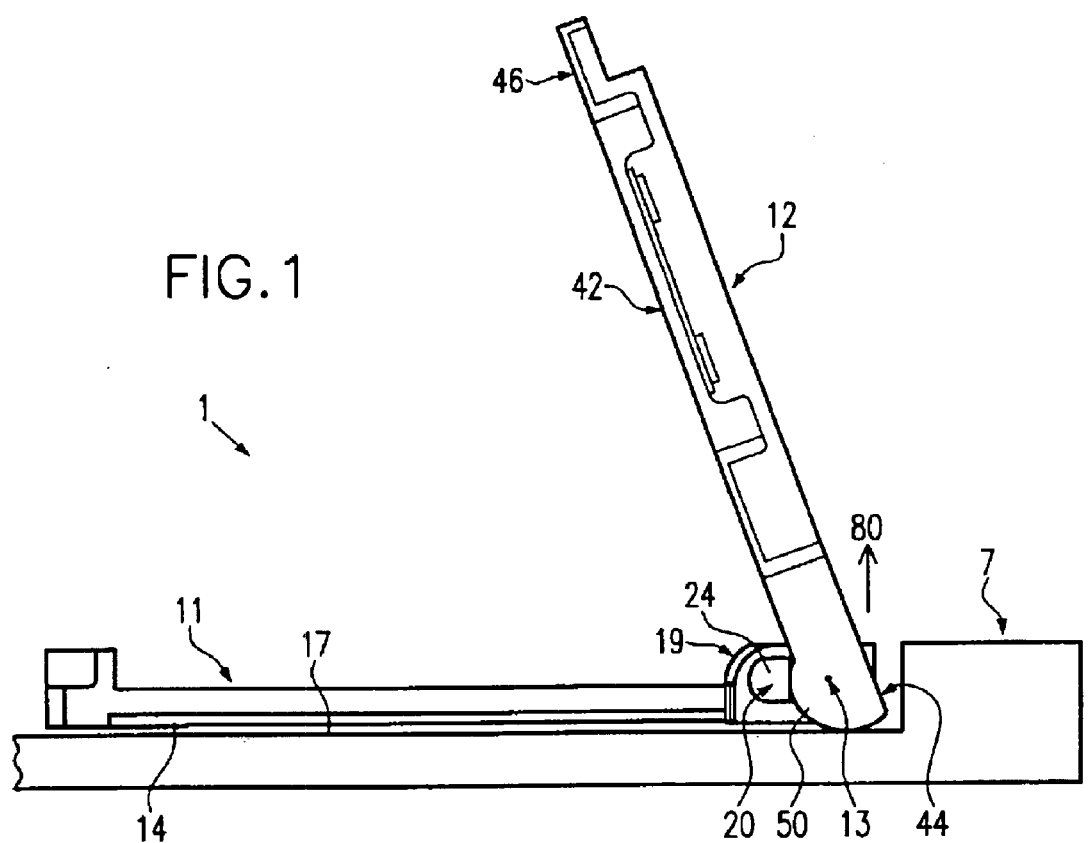
FIG. 1 is a side-elevational view of a smart card connector in the form of a SIM-card connector in accordance with a first embodiment of the invention with the cover being shown in a first opening position.

While, preferably, as mentioned, at least two bearings 19 with similarly designed bearing recesses 20 are provided at opposite sides of a preferably rectangular-shaped contact element support 11 (as shown for instance for a known smart-card connector of this type in detail in EP 0 472 692) it is understood that a plurality of such bearings 19 with respective bearing recesses 20 could be provided along the rotary or pivot axis 13 of the cover 12.

Figure 2:
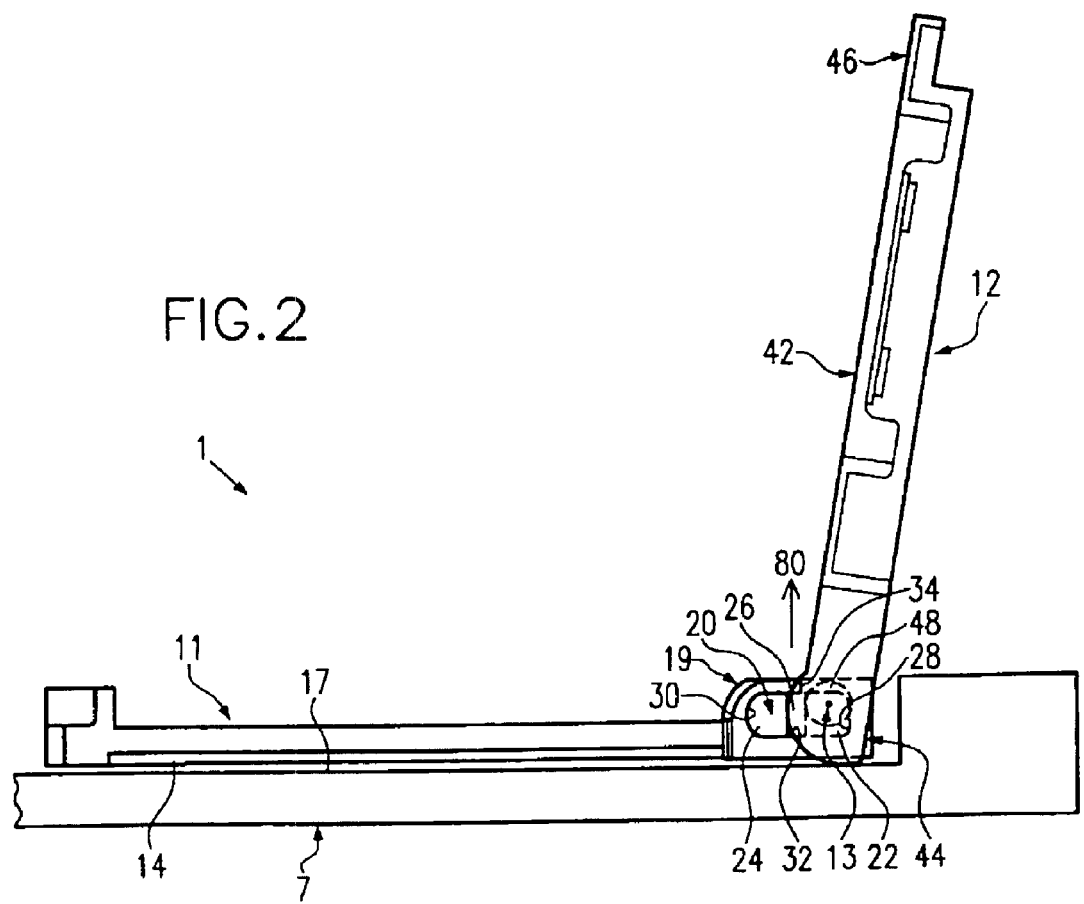
FIG. 2 is a side-elevational view of the SIM-card connector of FIG. 1, wherein the cover is shown in a second opening position.
Figure 5:
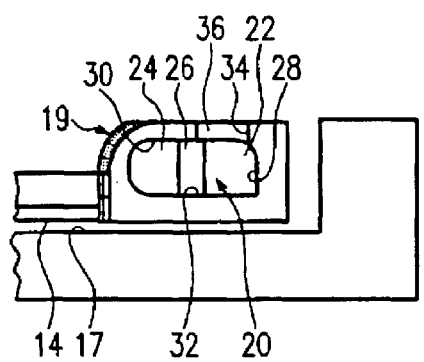
FIG. 5 is an enlarged side-elevational view of the contact element support of the SIM-card connector of FIG. 1 without a cover being pivotally mounted thereon.
Figure 4:
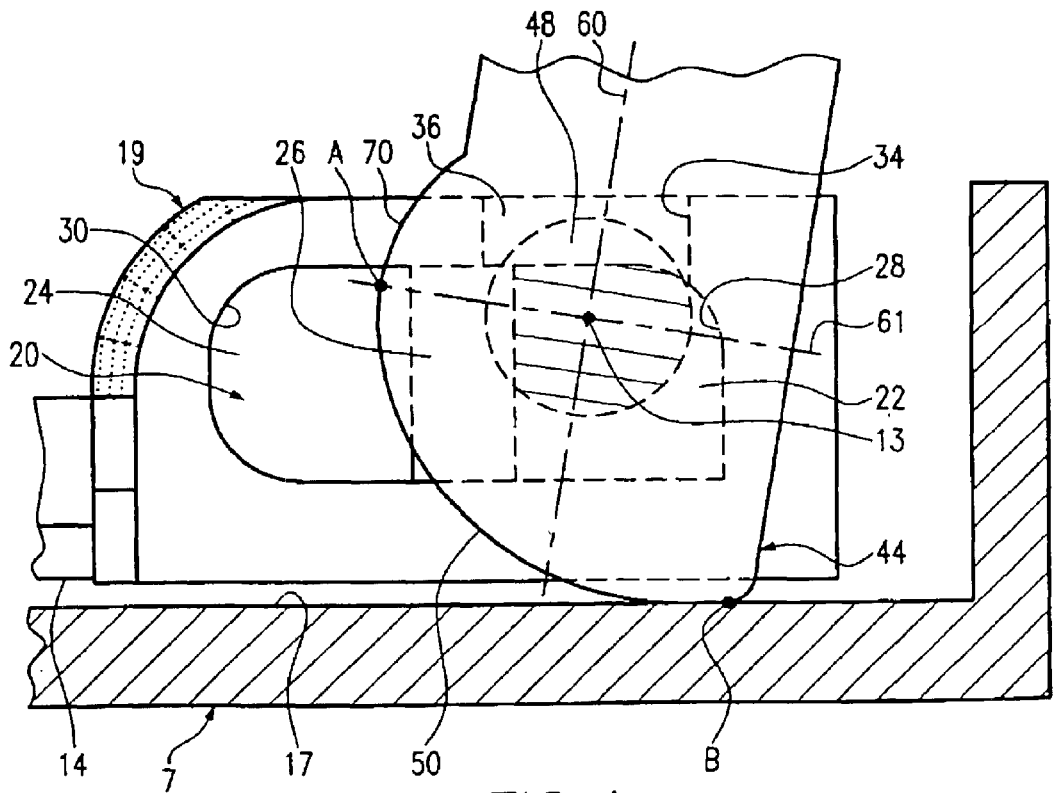
FIG. 4 is an enlarged part of FIG. 2, wherein covered portions are shown by dashed lines.

In FIG. 1 a part of the bearing recess or bearing location 20 is covered by the pivotable mounted cover 12. The respective covered portions are shown by dashed lines in FIGS. 2, 4 and 5. FIGS. 2, 4 and 5 also disclose that the bearing recess 20 has a generally rectangular form with rounded corners. The bearing recess 20 comprises a pivot position or location 22 and preferably a locking or latching position or location 24. The pivot location 22 and the latching location 24 are separated from each other within the bearing recess 20 by means of a rib 26. Generally speaking, the bearing recess 20 comprises the following recesses in the contact element support blocks or bearings 19: A pivot recess 28 and a latching recess 30 are provided having a first depth extending into the plane of the drawing. Further, a recess 32 having a lesser depth than the first mentioned depth is provided in the area of the rib 26. In FIGS. 2, 4 and 5 a recess or opening 34 is shown at the contact element support bearing 19, the depth of the recess 34 being smaller than the first depth for the pivot and latching recesses 28 and 30, respectively. The opening 34 defines in the contact element support bearing 19 a relief position 36 which will be described in more detail below.

Figure 3:
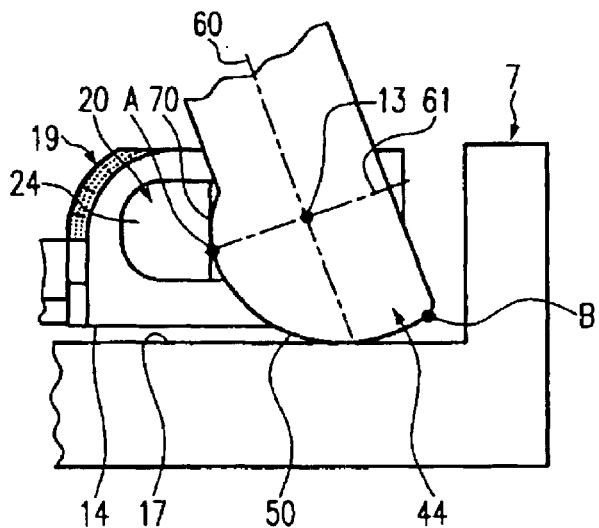
FIG. 3 is an enlarged part of FIG. 1.

The cover 12 is provided at two oppositely arranged cover hinge or bearing portions 44 with cover bearing means, which, as is shown in FIGS. 1 and 2, comprise, in substance, at the hinge or bearing portion 44 a cover bearing in the form of a pivot pin 48 which is inserted into bearing recess 20. Preferably, two pivot pins 48 are provided at laterally opposite sides of the cover 12. In FIGS. 1 and 3 said bearing pin 48 is covered but is shown schematically by dashed lines in FIGS. 2 and 4.

The cover portion 42 comprises in general the actuating portion(s) 46 which comprises suitable means for handling and operating the cover 12. The cover portion 42 of the cover 12 is provided with abutment and holding means for the SIM-card (not shown) which can be inserted into said cover 12. This is known from the prior art. It is also possible to insert the card into the contact-element support 11 prior to closing the cover 12.

Furthermore, at the cover bearing portion 44 an excenter or cam 50 is provided, preferably formed together with the cover 12, by injection moulding of plastic material.

For a clearer representation, the contact element support bearing(s) 19 and the cover bearing pins 48, which are inserted into said contact element support bearing(s) 19, are shown in enlarged version in FIGS. 3 and 4 with covered portions in FIG. 4 being shown by dashed lines. The pivot pin 48 has generally the shape of a circular cylinder and is, preferably, completely received within the pivot and latching recesses 28 and 30, respectively. The center axis of the circular cylindrical pivot pin 48 defines the position of the rotary or pivot axis 13. Even though only one cover bearing portion 44 is shown in the drawings, it is quite clear, that preferably two contact element support bearings 19 are provided to co-operate with respective two cover bearings 48.

Cam means, preferably two cams 50 are provided, each one formed at the laterally oppositely located ends of the cover 12, i.e. at ends which are opposite to the actuating portions 46. For further explanations, FIGS. 3 and 4 show a longitudinal axis 60 of the cover 12 as cutting the pivot axis 13 and also cutting a transversal axis 61 extending perpendicular to the longitudinal axis 60. Each cam 50 is defined in substance by an outer surface 70 of the cover bearing portion 44. Said outer surface 70 has a distance with respect to the pivot axis 13 or the centre axis of the pivot pin 48 which becomes larger and larger starting from an imaginary sectional point A (FIG. 3) of the transversal axis 61 with the outer surface 70 and ending at a point B on the outer surface 70.

For a closed cover 12 (not shown), point A on the outer surface 70 of the cover bearing portion 44 is approximately in a plane with the bottom surface 14 of the contact element support 11. Preferably, the outer surface 70 of the cover bearing portion 44 is, for a closed cover 12 in engagement with the mounting surface 17 of the housing 7 at point A. When opening the cover 12 from its closed position, the outer surface 70 continues to be supported and abut at the mounting surface 17. The cam 50 defined by the outer surface 70 will then—for a continued opening movement— roll in a clockwise direction on the mounting surface 17 and will press due to the increasing distance of the outer surface 70 with respect to the center axis of the pivot pin 48, the pivot axis 13 perpendicularly away from the mounting surface 17 as is shown by the arrow 80 in FIGS. 1 and 2 (in FIGS. 1 to 4 the movement is upwardly). Thus, the pivot pin 48 is pushed outwardly and upwardly in the direction of the arrow 80 into the relief position due to the rolling of the cam 50 on the mounting surface 17 at the pivot location 22.

As shown best in FIG. 4, due to the shape of the outer surface 70 of the cam 50, the pivot pin 48 is moved out of the pivot location 22 into the relief position 36 defined by the opening 34. FIG. 4 shows an example how the pivot pin 48 has been moved at least partially into the relief position 36 of the bearing location 20 due to the complete rolling of the cam 50 on the mounting surface 17. In this manner it is guaranteed that neither the pivot pin 48 nor the bearing recess 20 is destroyed if the cover 12 is incorrectly operated, i.e. is pivoted beyond a certain predetermined angular degree. This is so because the pivot pin 48 will move into its relief position (FIGS. 2, 4) through opening 34 in the contact element support bearing 19 if the cover 12 is opened further from the position shown in FIGS. 1 and 3. In case the cover 12 has been moved out of the bearing position 20 into its relief position 36 due to an inappropriate operation thereof, then the pivot pins 48 of the cover 12 can be easily reinserted through the opening 34 into the bearing location 20 or if more bearing locations are provided into the bearing locations 20.

In the preferred embodiment of the invention each one cam 50 is formed at the two oppositely arranged cover bearing portions 44. The cams 50 could also be formed at a different location of the cover 12 and still be effective to move the pivot pin(s) 48 out of the bearing recess 20 when opening the cover 12 such that the pivot pin(s) 48 come into the release position.

The cam surface or leveraging surface for the cam 50 can be a different surface than the mounting surface 17. Said cam surface can either be formed in the apparatus 7 or else on the contact element support 11. It is also conceivable that the pivot pin 48 is moved not upwardly out of the bearing location 20. By using a suitably designed cam the movement of the pivot pin(s) 48 occurs into a different direction for instance sideways, to the right, or to the left according to the drawings.

Additional improvements and modifications can be gathered from the description as well the drawings and the appended claims.

What is claimed is:

1. A smart-card connector (1) comprising:
   a contact-element support (11) defining contact element bearing means (20), contact elements mounted in said contact-element support (11),
   a cover (12) comprising cover bearing means (48) pivotally mounting said cover (12) at the contact element support bearing means and defining a pivot location (22) for said cover (12) for movement from an opening position into a closed position,
   said cover (12) being pivotably mounted about a pivot axis (13) extending through said pivot location (22), and
   wherein said cover (12) is provided with cam means (50) adapted to move the cover bearing means (48) out of the pivot location (22) and into a relief position (36) when the cover (12) is opened a certain angular degree beyond the opening position.

2. A smart-card connector (1) according to claim 1, wherein said contact-element support comprises a frame (11).

3. A smart-card connector (1) according to claim 1, wherein said cover (12) comprises a cover portion (42).

4. A smart-card connector (1) according to claim 1, comprising
   at least two oppositely arranged pivot locations (22) and said contact-element support bearing means comprises two oppositely located contact element support bearings (19) adapted to co-operate with two corresponding oppositely located cover bearings (48) provided at the cover (12).

5. A smart-card connector (1) according to claim 1, wherein adjacent to the pivot location (22) the relief position (36) is provided by a recess (34) in said contact element bearing means.

6. A smart-card connector (1) according to claim 1, wherein said cam means (50) is adapted to co-operate with a cam or leveraging surface (17) so as to move the cover (12) out of the pivot location (22) in said contact element support into the relief position (36).

7. A smart-card connector (1) according to claim 6, wherein the leveraging surface is formed at the contact element support.

8. A smart-card connector (1) according to claim 6, wherein the leveraging surface is provided by a surface of an apparatus (7) within which the smart-card connector (1) is installed.

9. A smart-card connector (1) according to claim 8, wherein the contact element support comprises a bottom surface (14) which is adapted to be placed on a mounting surface (17) in the apparatus (7) when the smart-card connector (1) is installed into said apparatus (7), wherein said mounting surface (17) in the apparatus serves as the leveraging surface.

10. A smart-card connector (1) according to claim 1, wherein a direction of movement (80) into which the cover bearing means (48) is moved by the cam means (50) during opening of the cover (12) extends perpendicularly with respect to the leveraging surface (17).

11. A smart-card connector (1) according to claim 1, wherein said cam means (50) comprises two spaced cams (50) each at an outer surface (70) of cover bearing portions (70).

12. A smart-card connector (1) according to claim 1, wherein adjacent to the pivot location (22) in the contact element support at least one latching location (24) is formed into which said cover bearing means (48) can be moved by longitudinal movement of the cover (12).

13. A smart-card connector (1) according to claim 1, wherein the cover bearing means comprise two bearing or pivot pins (48),
   wherein said pivot pins are inserted into pivot recesses (28) in said contact element support,
   said pivot recesses (28) defining said pivot location (22), and wherein the relief position (36) is defined by relief openings (34) in the contact element support (11) adjacent to the pivot recesses (28).

14. A smart-card connector (1) comprising:
   a contact element support (11) defining contact element bearing means (20) in the form of two oppositely located bearing recesses (20),
   a cover (12) comprising cover bearing means in the form of two oppositely located pivot pins (48) adapted to be inserted into said contact recesses for pivotably mounting said cover about a pivot axis (13), and two oppositely located cams (50) at oppositely located cover ends adjacent to said pivot axis so as to move the cover bearing pins out of the contact element support recesses into a relief position (36) when the cover is opened a certain angle degree beyond an opening position of about 60° of the cover.

* * * * *